US008968902B2

(12) United States Patent
Coors et al.

(10) Patent No.: US 8,968,902 B2
(45) Date of Patent: *Mar. 3, 2015

(54) LOW TEMPERATURE MOLTEN SODIUM SECONDARY CELL WITH SODIUM ION CONDUCTIVE ELECTROLYTE MEMBRANE

(75) Inventors: W. Grover Coors, San Diego, CA (US); Chett Boxley, Park City, UT (US); Mathew Robins, Saratoga Springs, UT (US); Alexis Eccleston, Salt Lake City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 594 days.

This patent is subject to a terminal disclaimer.

(21) Appl. No.: 13/290,716

(22) Filed: Nov. 7, 2011

(65) Prior Publication Data

US 2012/0219833 A1 Aug. 30, 2012

Related U.S. Application Data

(60) Provisional application No. 61/410,812, filed on Nov. 5, 2010.

(51) Int. Cl.
*H01M 4/52* (2010.01)
*H01M 4/38* (2006.01)
(Continued)

(52) U.S. Cl.
CPC .............. *H01M 10/39* (2013.01); *H01M 4/32* (2013.01); *H01M 4/362* (2013.01); *H01M 4/52* (2013.01);
(Continued)

(58) Field of Classification Search
USPC .......................... 429/231.9, 231.95, 102–104
See application file for complete search history.

(56) References Cited

U.S. PATENT DOCUMENTS

| | | | |
|---|---|---|---|
| 6,007,943 A * | 12/1999 | Coetzer | 429/104 |
| 2005/0260460 A1 | 11/2005 | Kishi et al. | |
| 2006/0141346 A1 | 6/2006 | Gordon et al. | |
| 2008/0268327 A1 | 10/2008 | Gordon et al. | |

FOREIGN PATENT DOCUMENTS

| | | |
|---|---|---|
| JP | 08321322 | 12/1996 |
| JP | 2004178991 | 6/2004 |

OTHER PUBLICATIONS

Li et al., "Rechargeable Ni-Li Battery Integrated Aqueous/Nonaqueous System", J. Am. Chem. Soc. 131 (2009), ACS, (Oct. 5, 2009), 15098-15099.*

(Continued)

*Primary Examiner* — Maria J Laios
*Assistant Examiner* — Robert S Carrico
(74) *Attorney, Agent, or Firm* — David Fonda

(57) ABSTRACT

The present invention provides a molten sodium secondary cell. In some cases, the secondary cell includes a sodium metal negative electrode, a positive electrode compartment that includes a positive electrode disposed in a liquid positive electrode solution, and a sodium ion conductive electrolyte membrane that separates the negative electrode from the positive electrode solution. In such cases, the electrolyte membrane can comprise any suitable material, including, without limitation, a NaSICON membrane. Furthermore, in such cases, the liquid positive electrode solution can comprise any suitable positive electrode solution, including, but not limited to, an aqueous sodium hydroxide solution. Generally, when the cell functions, the sodium negative electrode is molten and in contact with the electrolyte membrane. Additionally, the cell is functional at an operating temperature between about 100° C. and about 170° C. Indeed, in some instances, the molten sodium secondary cell is functional between about 110° C. and about 130° C.

22 Claims, 9 Drawing Sheets

(51) Int. Cl.
*H01M 6/20* (2006.01)
*H01M 10/054* (2010.01)
*H01M 10/0562* (2010.01)
*H01M 10/39* (2006.01)
*H01M 4/32* (2006.01)
*H01M 4/36* (2006.01)
*H01B 1/12* (2006.01)
*H01M 4/48* (2010.01)
*H01M 10/38* (2006.01)

(52) U.S. Cl.
CPC ............... *H01B 1/122* (2013.01); *H01M 4/381* (2013.01); *H01M 4/48* (2013.01); *H01M 10/054* (2013.01); *H01M 10/0562* (2013.01); *H01M 10/38* (2013.01); *H01M 10/3918* (2013.01); *H01M 2300/002* (2013.01); *H01M 2300/0094* (2013.01)
USPC ......... 429/103; 429/347; 429/223; 429/231.9

(56) References Cited

OTHER PUBLICATIONS

Cho, Ki Y., "International Search Report", PCT application US2011/059624 (Corresponding to U.S. Appl. No. 13/290,716), (May 22, 2012), 1-3.

Cho, Ki Y., "Written Opinion of the International Searching Authority", PCT application US2011/059624 (Corresponding to U.S. Appl. No. 13/290,716), (May 22, 2012), 1-3.

Totsuka, Kazuhide "Patent Abstracts of Japan (JP 08-321322)", English Language Abstract of Japanese patent publication JP JP 08-321322, (Dec. 3, 1996), 1.

Bito, et al., "Bibliographical Data and Abstract of JP2004178991", Japanese Published Patent Application JP 2004178991, (Jun. 24, 2004), 1.

Wang, et al., "Room temperature Na/S batteries with sulfur composite Cathode Material", *Electrochemistry Communications 9* (2007), *Elsevier*, (Jun. 18, 2006), 31-34.

\* cited by examiner

LOW TEMPERATURE MOLTEN SODIUM SECONDARY CELL WITH SODIUM ION CONDUCTIVE ELECTROLYTE MEMBRANE

CROSS-REFERENCE TO RELATED APPLICATION

This application claims the benefit of U.S. Provisional Patent Application No. 61/410,812, filed Nov. 5, 2010, which application is incorporated by reference.

FIELD OF THE INVENTION

The present invention relates in general to batteries. More particularly, the present invention provides a molten sodium-based secondary cell (or rechargeable battery) with a sodium ion conductive electrolyte membrane that operates at a temperature between about 100° Celsius ("C") and about 170° C.

BACKGROUND OF THE INVENTION

Batteries are known devices that are used to store and release electrical energy for a variety of uses. In order to produce electrical energy, batteries typically convert chemical energy directly into electrical energy. Generally, a single battery includes one or more galvanic cells, wherein each of the cells is made of two half-cells that are electrically isolated except through an external circuit. During discharge, electrochemical reduction occurs at the cell's positive electrode, while electrochemical oxidation occurs at the cell's negative electrode. While the positive electrode and the negative electrode in the cell do not physically touch each other, they are generally chemically connected by at least one (or more) ionically conductive and electrically insulative electrolyte(s), which can either be in a solid or a liquid state, or in combination. When an external circuit, or a load, is connected to a terminal that is connected to the negative electrode and to a terminal that is connected to the positive electrode, the battery drives electrons through the external circuit, while ions migrate through the electrolyte.

Batteries can be classified in a variety of manners. For example, batteries that are completely discharged only once are often referred to as primary batteries or primary cells. In contrast, batteries that can be discharged and recharged more than once are often referred to as secondary batteries or secondary cells. The ability of a cell or battery to be charged and discharged multiple times depends on the Faradaic efficiency of each charge and discharge cycle.

While rechargeable batteries based on sodium can comprise a variety of materials and designs, most, if not all, sodium batteries requiring a high Faradaic efficiency employ a solid primary electrolyte separator, such as a solid ceramic primary electrolyte membrane. The principal advantage of using a solid ceramic primary electrolyte membrane is that the Faradaic efficiency of the resulting cell approaches 100%. Indeed, in almost all other cell designs electrode solutions in the cell are able to intermix over time and, thereby, cause a drop in Faradaic efficiency and loss of battery capacity.

The primary electrolyte separators used in sodium batteries that require a high Faradaic efficiency often consist of ionically conducting polymers, porous materials infiltrated with ionically conducting liquids or gels, or dense ceramics. In this regard, most, if not all, rechargeable sodium batteries that are presently available for commercial applications comprise a molten sodium metal negative electrode, a sodium $\beta''$-alumina ceramic electrolyte separator, and a molten positive electrode, which may include a composite of molten sulfur and carbon (called a sodium/sulfur cell), or molten $NiCl_2$, NaCl, and $NaAlCl_4$ (called a ZEBRA cell). Because these conventional high temperature sodium-based rechargeable batteries have relatively high specific energy densities and only modest power densities, such rechargeable batteries are typically used in certain specialized applications that require high specific energy densities where high power densities are typically not encountered, such as in stationary storage and uninterruptable power supplies.

Despite the beneficial characteristics associated with some conventional sodium-based rechargeable batteries, such batteries may have significant shortcomings. In one example, because the sodium $\beta''$-alumina ceramic electrolyte separator is typically more conductive and is better wetted by molten sodium at a temperature in excess of about 270° C. and/or because the molten positive electrode typically requires relatively high temperatures (e.g., temperatures above about 170° or 180° C.) to remain molten, many conventional sodium-based rechargeable batteries operate at temperatures higher than about 270° C. and are subject to significant thermal management problems and thermal sealing issues. For example, some sodium-based rechargeable batteries may have difficulty dissipating heat from the batteries or maintaining the negative electrode and the positive electrode at the relatively high operating temperatures. In another example, the relatively high operating temperatures of some sodium-based batteries can create significant safety issues. In still another example, the relatively high operating temperatures of some sodium-based batteries require their components to be resistant to, and operable at, such high temperatures. Accordingly, such components can be relatively expensive. In yet another example, because it may require a relatively large amount of energy to heat some conventional sodium-based batteries to the relatively high operating temperatures, such batteries can be expensive to operate and energy inefficient.

Thus, while molten sodium-based rechargeable batteries are available, challenges with such batteries also exist, including those previously mentioned. Accordingly, it would be an improvement in the art to augment or even replace certain conventional molten sodium-based rechargeable batteries with other molten sodium-based rechargeable batteries.

BRIEF SUMMARY OF THE INVENTION

The present invention provides a molten sodium secondary cell (or rechargeable battery) that functions at a temperature between about 100° C. and about 170° C. While the described molten sodium secondary cell can include any suitable component, in some non-limiting implementations, the cell includes a sodium metal negative electrode, a positive electrode compartment that includes a positive electrode disposed in a liquid positive electrode solution, and a sodium ion conductive electrolyte membrane that physically separates the negative electrode from the positive electrode solution.

Generally, the sodium negative electrode comprises an amount of sodium metal. In this regard, as the cell operates, the sodium negative electrode is in a liquid or molten state. While the sodium negative electrode may comprise any suitable type of sodium, including without limitation, a pure sample of sodium or a sodium alloy, in some non-limiting implementations, the negative electrode comprises a sodium sample that is substantially pure.

The positive electrode in the positive electrode compartment can comprise any suitable material that allows the cell to function as intended. Indeed, in some non-limiting implementations, the positive electrode comprises a wire, felt, mesh, plate, tube, foam, or other suitable positive electrode configuration. In one non-limiting embodiment, the positive electrode includes nickel, nickel oxyhydroxide (NiOOH), nickel hydroxide (Ni(OH)$_2$), sulfur composites, sulfur halides, including sulfuric chloride, and/or any other suitable positive electrode material.

The liquid positive electrode solution in the positive electrode compartment can comprise any suitable material that is capable of conducting sodium ions to and from the electrolyte membrane and that otherwise allows the cell to function as intended. Some examples of suitable positive electrode solution materials include, but are not limited to, sodium hydroxide, water, glycerol, borax (sodium tetraborate decahydrate), sodium metaborate tetrahydrate, boric acid, sodium borohydride, sodium silicate, sodium phosphate, sodium hydrogen phosphate, sodium glycerol, sodium carbonate, sodium iodide or other sodium halides, ethylene, propylene, one or more ionic liquids, and any suitable combination thereof. Indeed, in some non-limiting instances, the positive electrode solution comprises an aqueous sodium hydroxide solution.

The sodium ion conductive electrolyte membrane can comprise any membrane (which is used herein to refer to any suitable type of separator) that: selectively transports sodium ions, that is stable at the cell's operating temperature, that is stable when in contact with molten sodium and the positive electrode solution, and that otherwise allows the cell to function as intended. Indeed, in some non-limiting implementations, the electrolyte membrane comprises a sodium (NA) Super Ion CONductive ("NaSICON") membrane that is substantially impermeable to water. For purposes of this specification, the terms "NaSICON" and "NaSICON material" may be used interchangeably. Accordingly, in such implementations, the water impermeable electrolyte membrane can allow the positive electrode solution to comprise an aqueous solution, which would react violently if it were to contact the sodium negative electrode.

Where the electrolyte membrane comprises a NaSICON membrane, the membrane can comprise any suitable kind of NaSICON membrane, including, without limitation, a composite NaSICON membrane. In this regard, and by way of non-limiting illustration, the membrane can comprise any known or novel composite NaSICON membrane that includes a dense NaSICON layer and a porous NaSICON layer, or a dense NaSICON layer with a cermet layer, such as a NiO/NaSICON cermet layer.

The described secondary cell may operate at any suitable operating temperature. Indeed, in some non-limiting implementations, the cell functions (e.g., is discharged or recharged) while the temperature of the cell is as high as a temperature selected from about 98° C., about 110° C., 120° C., about 130° C., about 150° C., and about 170° C. Indeed, in some non-limiting implementations, as the cell functions, the temperature of the negative electrode is about 120° C.±about 10° C. In some embodiments, the cell is pressurized ranging from about 1 psi to about 30 psi. In one embodiment, the cell may be pressurized in a range of about 10 psi to about 15 psi. These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings are not made to scale, depict only some representative embodiments of the invention, and are not therefore to be considered to be limiting of its scope, the invention will be described and explained with additional specificity and detail through the use of the accompanying drawings in which:

Figure 4:
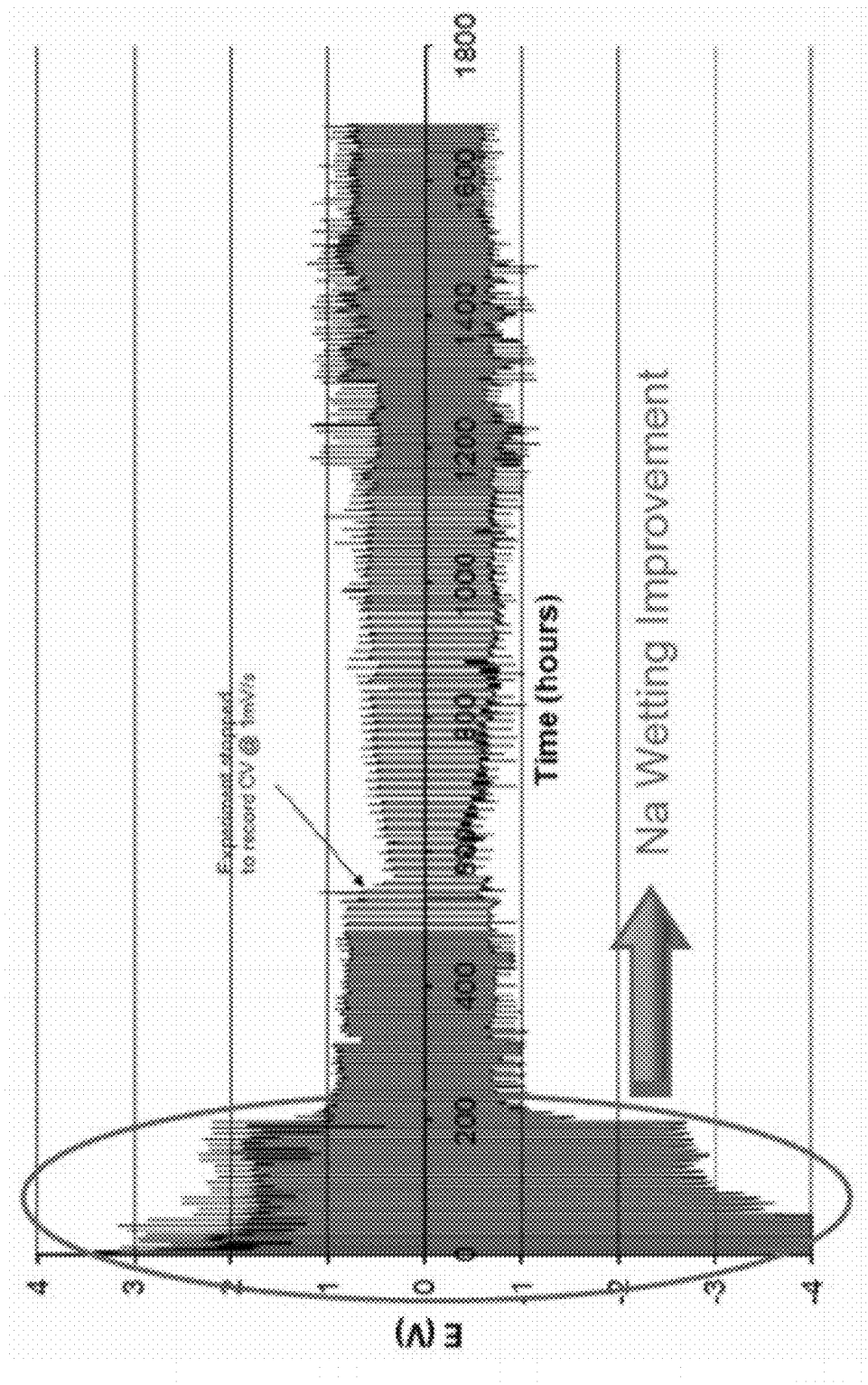
Figure 5:
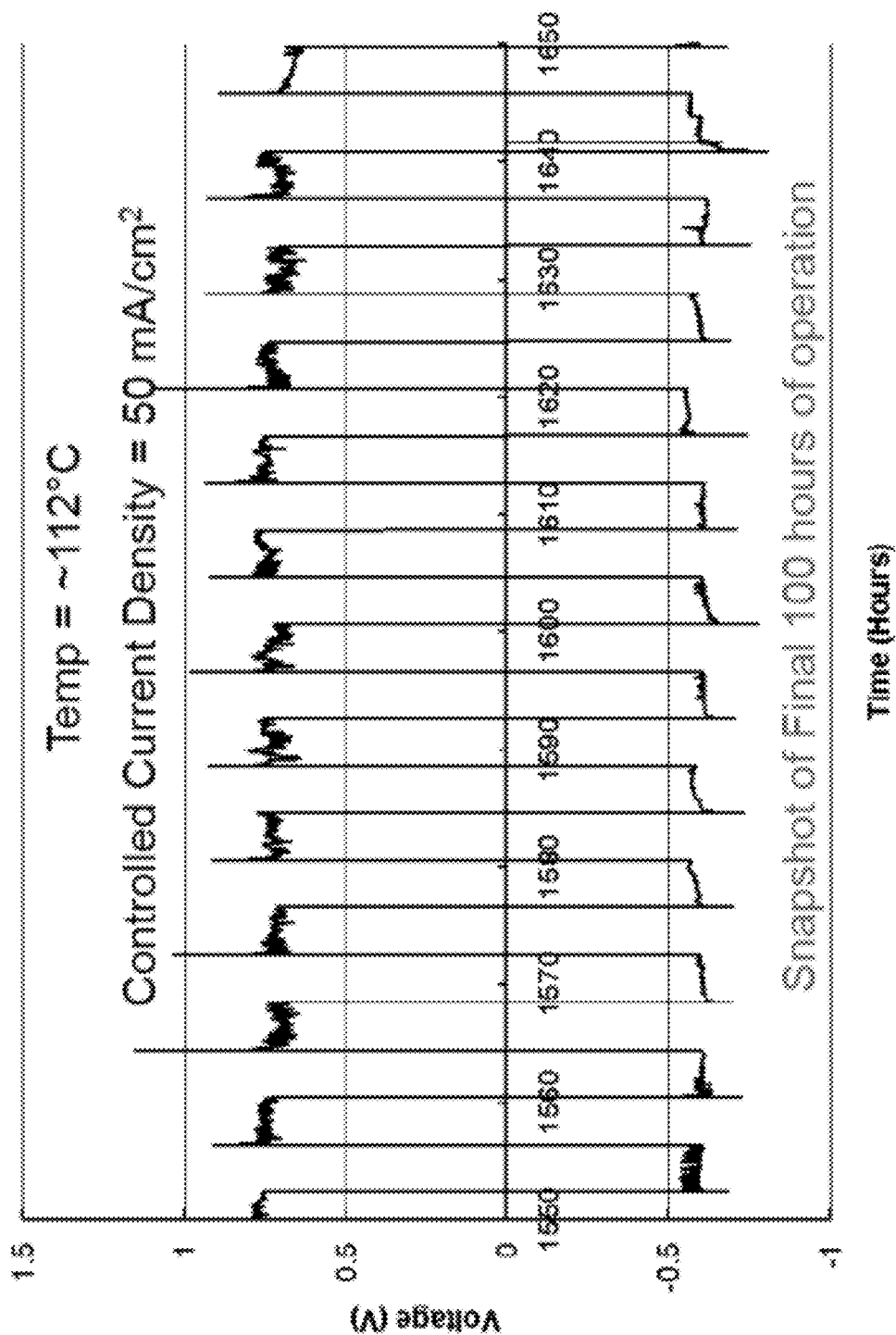
Figure 6:
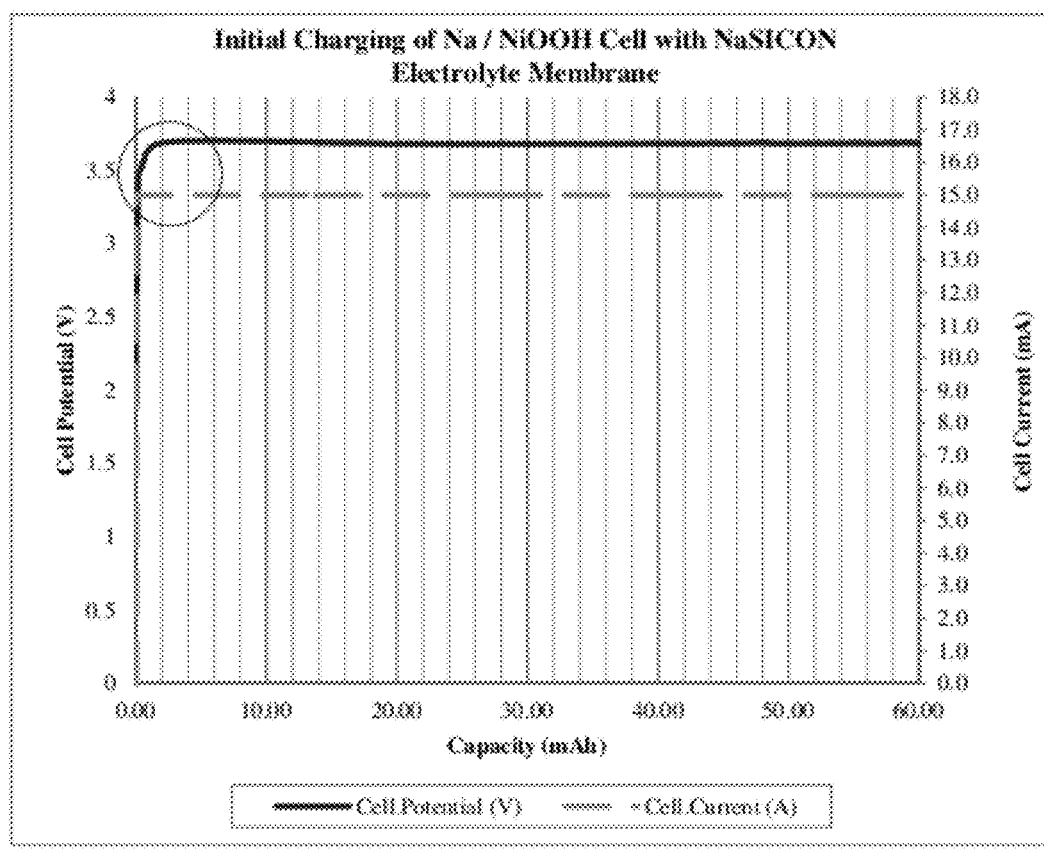
Figure 7:
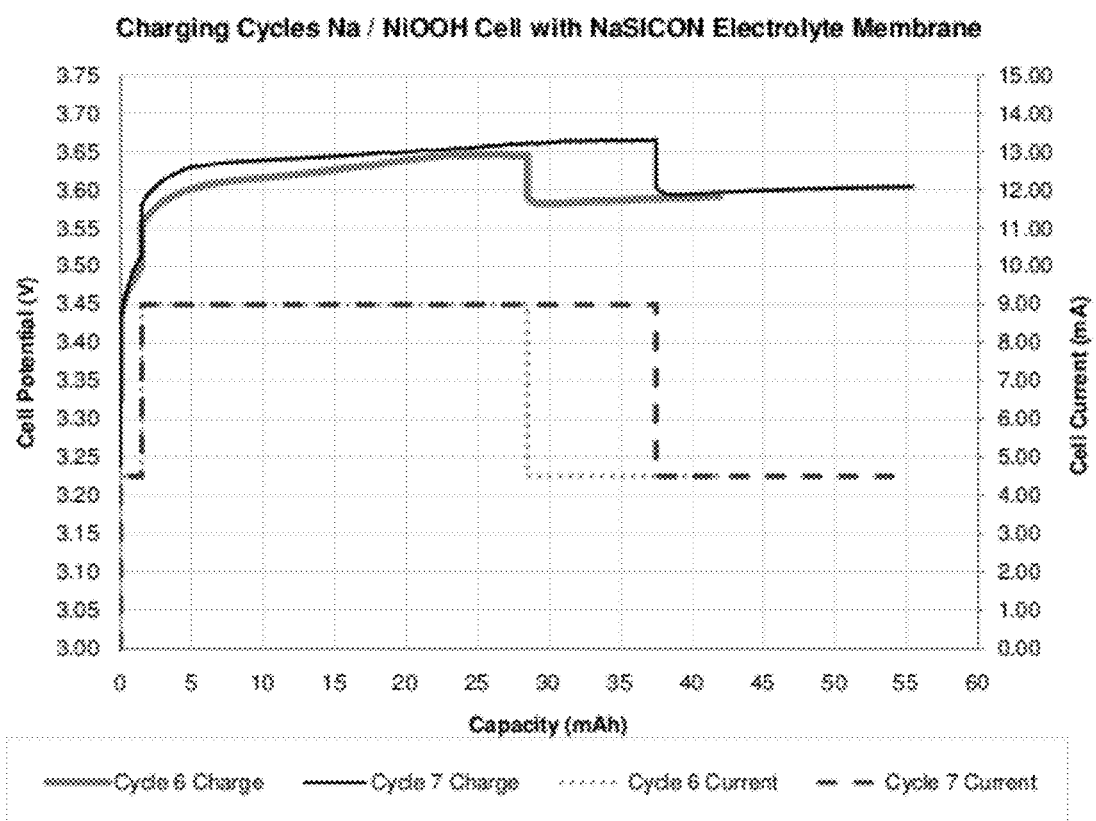
Figure 8:
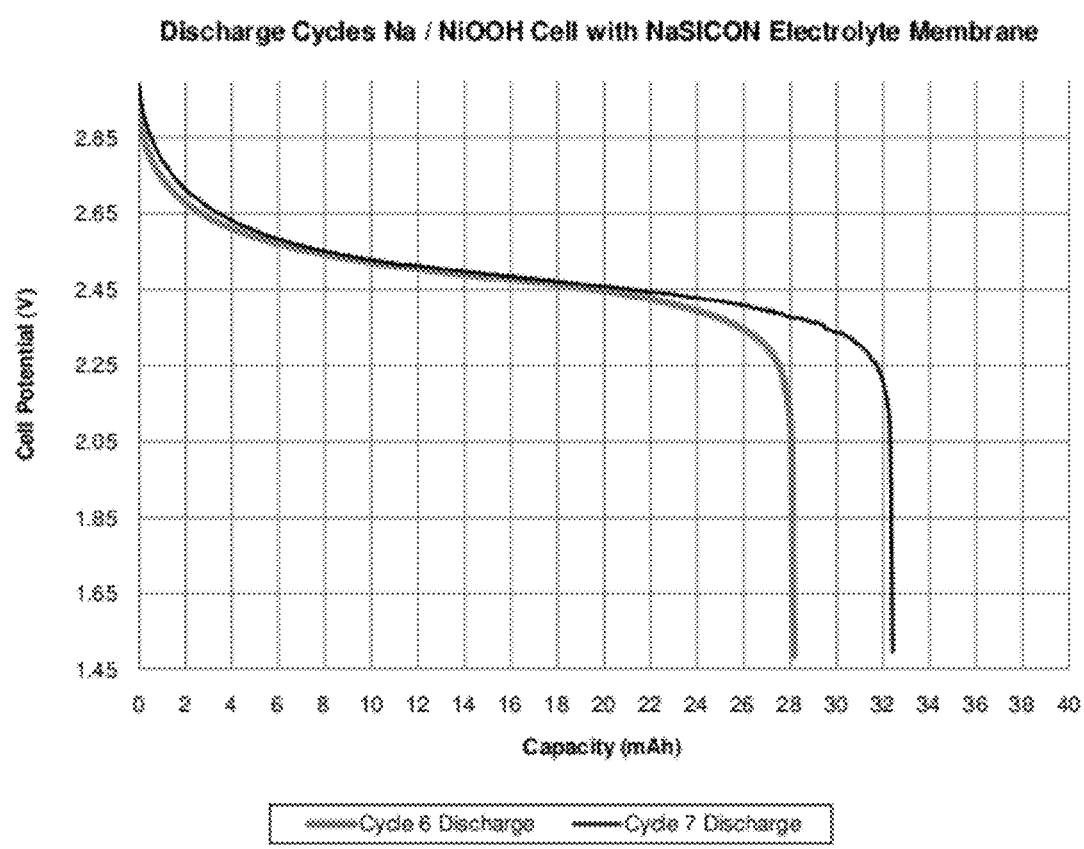
Figure 9:
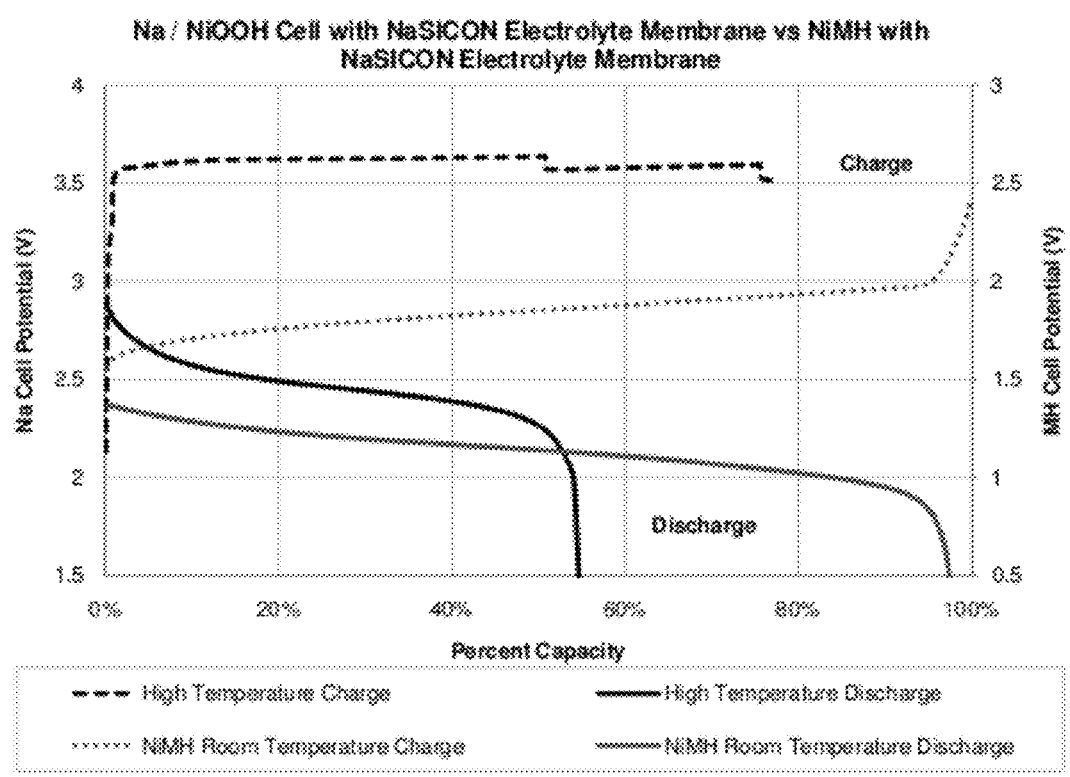

FIGS. 4 and 5 each depict a computer generated graph showing experimental results showing the measured voltage over an extended period of time of a representative embodiment of the cell comprising molten sodium on both sides of the NaSICON membrane;

FIG. 6 depicts a charging curve for a sodium/NiOOH cell having a NaSICON electrolyte separator membrane;

FIG. 7 depicts charging cycles for a sodium/NiOOH cell having a NaSICON electrolyte separator membrane;

FIG. 8 depicts discharge cycles for a sodium/NiOOH cell having a NaSICON electrolyte separator membrane; and FIG. 9 depicts a comparison of charge and discharge cycles for a sodium/NiOOH cell having a NaSICON electrolyte separator membrane operated at 120° C. with a nickel metal hydride cell having a NaSICON electrolyte separator membrane operated at room temperature.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and aspects of the described invention, all of the described embodiments and examples are to be considered, in all respects, as illustrative only and not as being limiting in any manner.

Furthermore, the described features, structures, or characteristics of the invention may be combined in any suitable manner in one or more embodiments. In the following description, numerous specific details are provided, such as examples of suitable sodium negative electrodes, positive electrode materials, liquid positive electrode solutions, sodium ion conductive electrolyte membrane, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As stated above, secondary cells can be discharged and recharged and this specification describes cell arrangements and methods for both states. Although the term "recharging" in its various forms implies a second charging, one of skill in the art will understand that discussions regarding recharging would be valid for, and applicable to, the first or initial charge, and vice versa. Thus, for the purposes of this specification, the terms "recharge," "recharged" and "rechargeable" shall be interchangeable with the terms "charge," "charged" and "chargeable" respectively.

Figure 1:
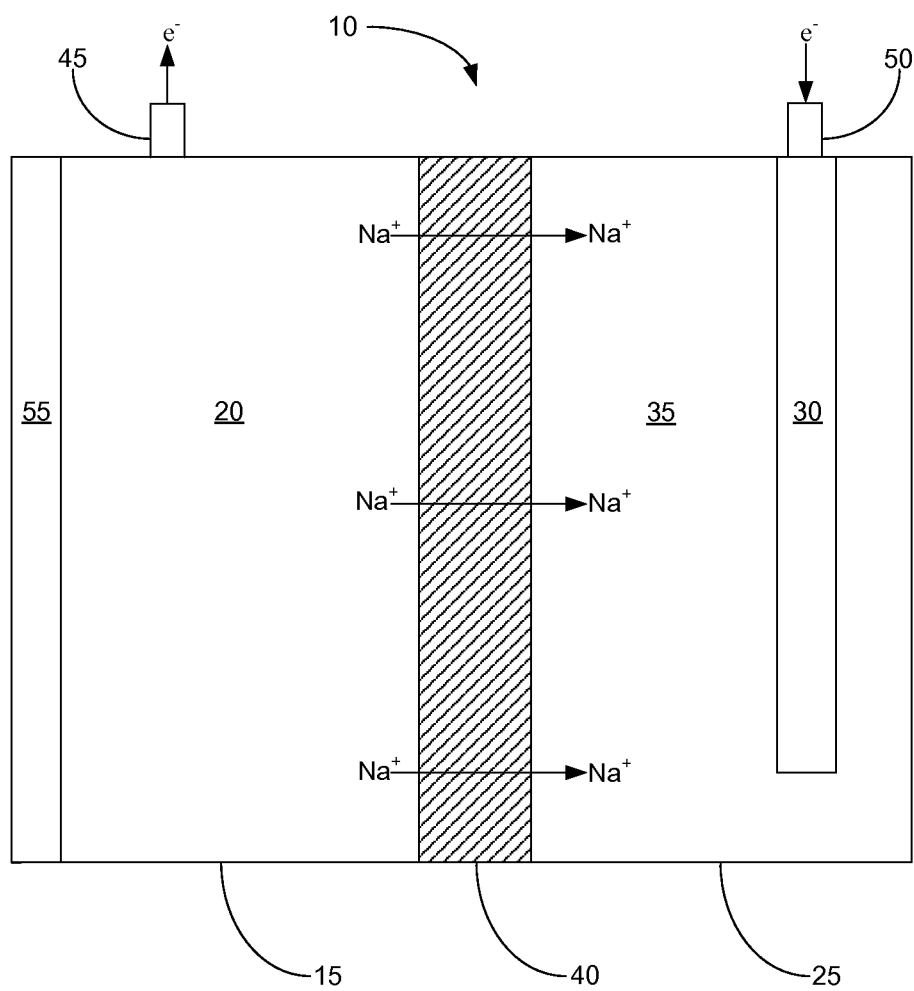
FIG. 1 depicts a schematic diagram of a representative embodiment of a molten sodium secondary cell, wherein the cell is in the process of being discharged.

The present invention provides a molten sodium secondary cell that functions at an operating temperature between about 100° C. and about 170° C. While the described cell can comprise any suitable component, FIG. 1 shows a representative embodiment in which the molten sodium secondary cell 10 comprises an negative electrode compartment 15 that includes a sodium metal negative electrode 20, a positive electrode compartment 25 that comprises a positive electrode 30 that is disposed in a liquid positive electrode solution 35, a sodium ion conductive electrolyte membrane 40 that separates the negative electrode from the positive electrode solution, a first terminal 45, and a second terminal 50. To provide a better understanding of the described cell 10, a brief description of how the cell functions is provided below. Following this discussion, each of the cell's components shown in FIG. 1 is discussed in more detail.

Turning now to the manner in which the molten sodium secondary cell 10 functions, the cell can function in virtually any suitable manner. In one example, FIG. 1 illustrates that as the cell 10 is discharged and electrons (e⁻) flow from the negative electrode 20 (e.g., via the first terminal 45), sodium is oxidized from the negative electrode 20 to form sodium ions ($Na^+$). FIG. 1 shows that these sodium ions are respectively transported from the sodium negative electrode 20, through the sodium ion conductive membrane 40, and to the positive electrode solution 35.

Figure 2:
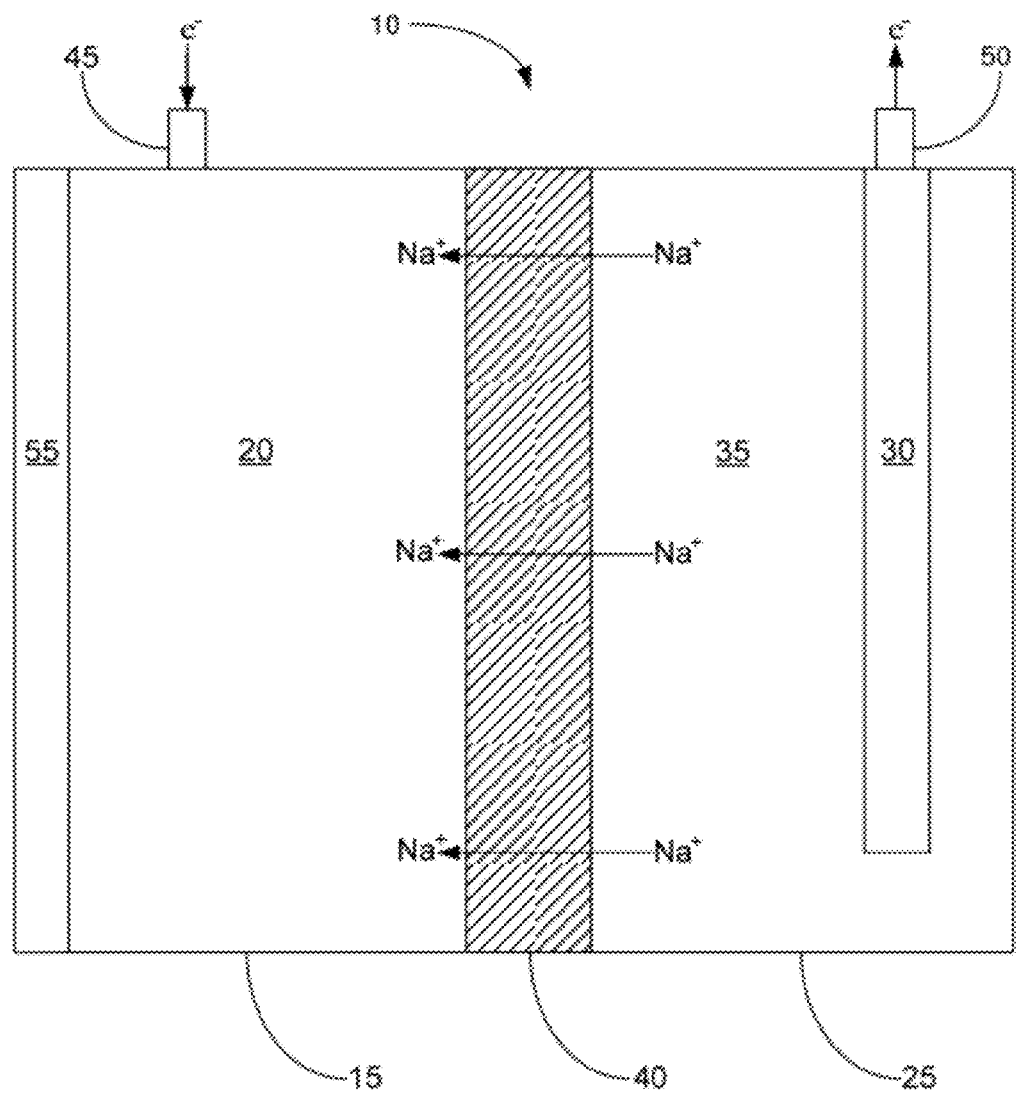
FIG. 2 depicts a schematic diagram of a representative embodiment of the molten sodium secondary cell, wherein the cell is in the process of being recharged.

In a contrasting example, FIG. 2 shows that as the secondary cell 10 is recharged and electrons (e⁻) flow into the sodium negative electrode 20 from an external power source (not shown), such as a recharger, the chemical reactions that occurred when the cell 10 was discharged (as shown in FIG. 1) are reversed. Specifically, FIG. 2 shows that as the cell 10 is recharged, sodium ions ($Na^+$) are respectively transported from the positive electrode solution 35, through the electrolyte membrane 40, and to the negative electrode 20, where the sodium ions are reduced to form sodium metal (Na).

Referring now to the various components of the cell 10, the cell, as mentioned above, can comprise an negative electrode compartment 15 and a positive electrode compartment 25. In this regard, the two compartments can be any suitable shape and have any other suitable characteristic that allows the cell 10 to function as intended. By way of example, the negative electrode and the positive electrode compartments can be tubular, rectangular, or be any other suitable shape. Furthermore, the two compartments can have any suitable spatial relationship with respect to each other. For instance, while FIG. 2 shows that the negative electrode compartment 15 and the positive electrode compartment 25 can be adjacent to each other, in other embodiments (not shown), one compartment (e.g., the negative electrode compartment) is disposed, at least partially, in the other compartment (e.g., the positive electrode compartment), while the contents of the two compartments remain separated by the electrolyte membrane 40 and any other compartmental walls.

With respect to the negative electrode 20, the cell 10 can comprise any suitable sodium negative electrode 20 that allows the cell 10 to function (e.g., be discharged and recharged) as intended. Some examples of suitable sodium negative electrode materials include, but are not limited to, a sodium sample that is substantially pure and a sodium alloy comprising any other suitable sodium-containing negative electrode material. In certain embodiments, however, the negative electrode comprises or consists of an amount of sodium that is substantially pure. In such embodiments, because the melting point of pure sodium is around 98° C., the sodium negative electrode will become molten above that temperature.

With respect to the positive electrode 30, the cell 10 can comprise any suitable positive electrode that allows the cell to be charged and discharged as intended. For instance, the positive electrode can comprise virtually any positive electrode material that has been successfully used in a sodium-based rechargeable battery system. In some embodiments, the positive electrode comprises a wire, felt, plate, tube, mesh, foam, and/or other suitable positive electrode configuration. In one non-limiting embodiment, the positive electrode comprises a nickel foam, nickel hydroxide ($Ni(OH)_2$), nickel oxyhydroxide (NiOOH), sulfur composites, sulfur halides, including sulfuric chloride, and/or another suitable material. Furthermore, these materials may coexist or exist in combinations. For example a suitable positive electrode material may be nickel oxyhydroxide (NiOOH) (e.g., when the cell is at least partially charged) and nickel hydroxide ($Ni(OH)_2$) (e.g., when the cell is at least partially discharged). In certain embodiments, however, the positive electrode comprises a nickel oxyhydroxide (NiOOH) electrode. It is understood that a nickel oxyhydroxide electrode, even when fully charged, will contain some amount of nickel hydroxide.

In some non-limiting embodiments where the positive electrode 30 comprises a nickel oxyhydroxide (NiOOH) electrode, the negative electrode 20 comprises sodium, and the positive electrode solution 35 (as discussed below) comprises an aqueous solution, the reactions that occur at the negative electrode and at the positive electrode and the overall reaction as the cell 10 is discharged may occur as illustrated below:

Negative electrode $Na \leftrightarrow Na^+ + 1e^-$ (−2.71V)
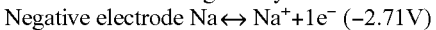
Positive electrode $NiOOH + H_2O \leftrightarrow Ni(OH)_2 + OH^-$ (0.52V)
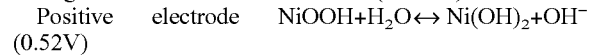
Overall $Na + NiOOH + H_2O \leftrightarrow Ni(OH)_2 + NaOH$ (3.23V)
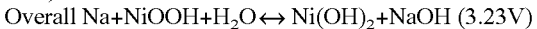

Accordingly, some embodiments of the describe cell 10, at least theoretically, are capable of producing about 3.2V±0.5V at standard temperature and pressure.

Moreover, some examples of overall reactions that may occur during the discharging and charging of a cell in which the positive electrode 30 comprises a nickel oxyhydroxide (NiOOH) electrode, the negative electrode 20 comprises sodium, and the positive electrode solution 35 (as discussed below) comprises an aqueous solution, are shown below:

(Discharge) $NiOOH + H_2O + Na + \rightarrow Ni(OH)_2 + NaOH$
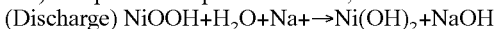
(Charge) $Ni(OH)_2 + NaOH \rightarrow NiOOH + H_2O + Na$
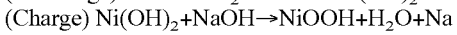

With respect now to the positive electrode solution 35, the positive electrode solution can comprise any suitable sodium ion conductive material that allows the cell 10 to function as intended. Additionally, in some embodiments, the positive electrode solution has a higher sodium ion conductivity than does the electrolyte membrane 40 (described below). In one embodiment, the positive electrode solution conductivity ranges between about 25 mS/cm and 500 mS/cm. In other embodiments, the range may be between about 100 mS/cm and 300 mS/cm. In other embodiments, between about 150 mS/cm and 250 mS/cm. The NaSICON conductivity may range between about 20 and about 60 mS/cm. The NaSICON conductivity may range between about 30 and about 45 mS/cm. In one embodiment, for example, the conductivity of NaSICON GY, a NaSICON material made by Ceramatec, Inc., is about 56 mS/cm at 120° C. Other NaSICON compositions at this same temperature might have different conductivity. It will be appreciated by those of skill in the art that conductivity will vary as a function of temperature and the type of ceramic materials.

Some examples of suitable materials in the positive electrode solution include, but are not limited to, sodium hydroxide (NaOH), glycerol, water, borax, sodium silicate, sodium borate, boric acid, sodium borohydride, sodium phosphate, sodium glycerol, sodium carbonate, sodium iodide or other sodium halides, ethylene, propylene, an ionic liquid, another suitable liquid, and any suitable combination of the foregoing (For a more detailed description of suitable ionic liquids, see United States Application Publication No. 2011/0104526 entitled "Ambient Temperature Rechargeable Battery with Sodium Ion Conductive Ceramic Separator, filed Nov. 5, 2009, the entire disclosure of which is hereby incorporated by reference.)

By way of illustration, in some embodiments, the positive electrode solution 35 comprises one or more of the following solutions: sodium hydroxide and water; sodium hydroxide, borax, and water; glycerol and sodium hydroxide; glycerol, sodium hydroxide, and water; glycerol and borax; and borax and water.

The various ingredients in the positive electrode solution can have any suitable concentration that allows the cell 10 to function as intended. For instance, in some embodiments, the liquid positive electrode solution comprises from about 0 to about 85% (e.g., between about 4% and about 50%) sodium hydroxide, by weight; from about 0 to about 96% glycerol, by weight; from about 0 to about 45% borax, by weight; and from about 0 to about 93% water, by weight. In one embodiment, the positive electrode solution ranges from about 30% to about 75 wt % sodium tetraborate in water. In another embodiment, the positive electrode solution ranges from about 55% to about 65 wt % sodium tetraborate in water. By way of non-limiting illustration, Table 1 (shown below) provides some non-limiting examples of suitable positive electrode solutions.

TABLE 1

Positive Electrode Solutions

50% Sodium Hydroxide and 50% Water (filler)
15% Sodium Hydroxide, 28% Glycerol, and 57% Water (filler)
4% Sodium Hydroxide and 96% Glycerol (filler)
4% Sodium Hydroxide, 16% Water, and 80% Glycerol (filler)
45% Borax and 55% Glycerol (filler)
40% Borax and 60% Water (filler)
7.5% Sodium Hydroxide and 92.5% Water (filler)
15% Sodium Hydroxide and 85% Water (filler)
15% Sodium Hydroxide 28% Borax, and 57% Water (filler)
25% Sodium Hydroxide and 75% Water (filler)
25% Sodium Hydroxide, 28% Borax, and 47% Water (filler)

While the positive electrode solutions in Table 1 are shown to have specific concentrations, in other embodiments, the concentrations of the sodium hydroxide, borax, and/or glycerol in such solutions can each be modified by ±10%, by weight, and the concentration of the water or glycerol filler can be changed accordingly.

In some embodiments, the positive electrode solution 35 has a boiling point that is higher than the cell's operating temperature (discussed below). In such embodiments, the boiling point of positive electrode solution can be adjusted in any suitable manner that allows the cell to function properly with the positive electrode solution. In this regard, one non-limiting method for increasing the boiling point of an aqueous positive electrode solution comprises increasing the concentration of sodium hydroxide in the positive electrode solution.

In this manner, an aqueous sodium hydroxide positive electrode solution can be modified to allow the cell to function at higher temperatures (e.g., up to about 170° C.). Another way to increase the boiling point is to increase the pressure of the cell. In some non-limiting embodiments, the electrolytic cell is pressurized cell to a pressure in the range of 5 to 25 psi. Operating the cell at a pressure higher than 25 creates a risk of cracking a planar ceramic disk. However, if the ceramic is configured as a tube though, the pressure of the cell could be increased to 200 psi, because tube cells generally have greater mechanical strength and increased surface area exposed.

With regards now to the sodium ion conductive electrolyte membrane 40, the membrane can comprise any suitable material that selectively transports sodium ions and permits the cell 10 to function with a non-aqueous positive electrode solution or an aqueous positive electrode solution. In some embodiments, the electrolyte membrane comprises a NaSICON material. In such embodiments, the NaSICON material may comprise any known or novel NaSICON material that is suitable for use with the described cell 10. Some suitable examples of NaSICON compositions include, but are not limited to, $Na_3Zr_2Si_2PO_{12}$, $Na_{1+x}Si_xZr_2P_{3-x}O_{12}$ (where x is selected from 1.6 to 2.4), Y-doped NaSICON ($Na_{1+x+y}Zr_{2-y}Y_ySi_xP_{3-x}O_{12}$, $Na_{1+x}Zr_{2-y}Y_ySi_xP_{3-x}O_{12-y}$ (where x=2, y=0.12), and Fe-doped NaSICON ($Na_3Zr_2/_3Fe_4/_3P_3O_{12}$). Indeed, in certain embodiments, the NaSICON membrane comprises $Na_3Si_2Zr_2PO_{12}$. In still other embodiments, the NaSICON membrane comprises known or novel composite, cermet-supported NaSICON membrane. In such embodiments, the composite NaSICON membrane can comprise any suitable component, including, without limitation, a porous NaSICON-cermet layer that comprises NiO/NaSICON or any other suitable cermet layer, and a dense NaSICON layer. In yet other embodiments, the NaSICON membrane comprises a monoclinic ceramic.

Where the cell's electrolyte membrane 40 comprises a NaSICON material, the NaSICON material may provide the cell 10 with several beneficial characteristics. In one example, because NaSICON materials, as opposed to a sodium β"-alumina ceramic electrolyte separator, are substantially impermeable to, and stable in the presence of, water, NaSICON materials can allow the cell to include a positive electrode solution, such as an aqueous positive electrode solution, that would otherwise be incompatible with the sodium negative electrode 20. Thus, the use of a NaSICON membrane as the electrolyte membrane can allow the cell to have a wide range of battery chemistries. As another example of a beneficial characteristic that can be associated with NaSICON membranes, because such membranes selectively transport sodium ions but do not allow the negative electrode 20 and the positive electrode solutions 35 to mix, such membranes can help the cell to have minimal capacity fade and to have a relatively stable shelf life at ambient temperatures.

With reference now to the terminals 45 and 50, the cell 10 can comprise any suitable terminals that are capable of electrically connecting the cell with an external circuit, including without limitation, to one or more cells. In this regard, the terminals can comprise any suitable material and any suitable shape of any suitable size.

In addition to the aforementioned components, the cell 10 can optionally comprise any other suitable component. By way of non-limiting illustration FIG. 2 shows an embodiment in which the cell 10 comprises a heat management system 55. In such embodiments, the cell can comprise any suitable type of heat management system that is capable of maintaining the cell within a suitable operating temperature range. Some examples of such heat management systems include, but are not limited to, a heater, one or more temperature sensors, and appropriate temperature control circuitry.

The described cell 10 may function at any suitable operating temperature. In other words, as the cell is discharged and/or recharged, the sodium negative electrode may have any suitable temperature. Indeed, in some embodiments, the cell functions at an operating temperature that is as high as a temperature selected from about 120° C., about 130° C., about 150° C., and about 170° C. Moreover, in such embodiments, as the cell functions, the temperature of the negative electrode can be as low as a temperature selected from about 120° C., about 115° C., about 110° C., and about 100° C. Indeed, in some embodiments, as the cell functions, the temperature of the negative electrode between about 100° C. and about 150° C. In other embodiments, the cell functions at a temperature between about 100° C. and about 130° C. In yet other embodiments, however, as the cell functions, the temperature of the negative electrode is about 120° C.±about 10° C.

In addition to the aforementioned benefits of the cell 10, the described cell may have several other beneficial characteristics. By way of example, by being able to operate in a temperature range between about 100° and about 150° C., the cell 10 may operate in a temperature range that is significantly lower the operating temperature of certain conventional molten sodium rechargeable batteries. Accordingly, the described cell may require less energy to heat and/or dissipate heat from the cell as the cell functions, may be less dangerous use or handle, and may be more environmentally friendly.

The following examples are given to illustrate various embodiments within, and aspects of, the scope of the present invention. These are given by way of example only, and it is understood that the following examples are not comprehensive or exhaustive of the many types of embodiments of the present invention that can be prepared in accordance with the present invention.

EXAMPLE 1

Figure 3:
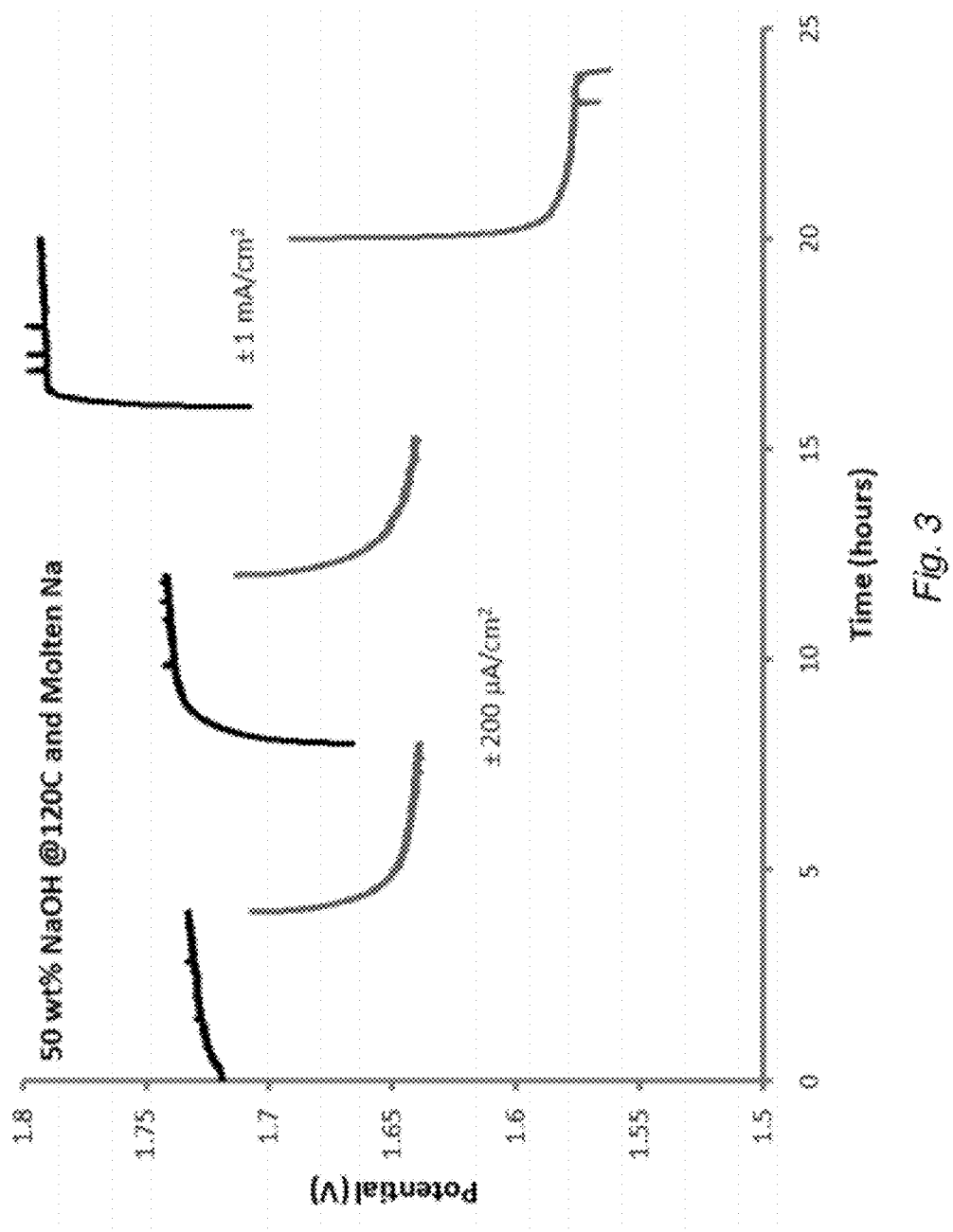
FIG. 3 depicts a computer generated graph showing experimental results showing the measured electrical potential over a period of time for a representative embodiment of the molten sodium secondary cell.

In one example, an embodiment of the described cell 10 was prepared to contain a sodium negative electrode 20 and a positive electrode solution 35 comprising an aqueous solution that included sodium hydroxide at a concentration of about 50%, by weight. The cell was then heated so that the sodium negative electrode became molten. As the cell was operated at an operating temperature of about 120° C., the electrical potential (in volts) of the cell was measured for around 25 hours. The results of this test are illustrated in FIG. 3. Specifically, FIG. 3 shows that as the described cell operated, the cell was capable of providing up to almost 1.6V for a prolonged period of time. The open circuit voltage of this cell was measured to be 1.75V; however the positive electrode material used was not a NiOOH material, which is why the open circuit voltage was significantly lower than the theoretical voltage of 3.23V. The full capacity (in mAhr) was not recorded for this demonstration cell. The discharge current for the final cycle was increased to 1 mA/cm2.

EXAMPLE 2

In another example, in order to show that a NaSICON electrolyte membrane is stable in the described cell 10 with a molten sodium negative electrode 20, an embodiment of the cell was prepared with a sodium negative electrode, a NaSICON membrane (namely membrane comprising $Na_3Zr_2Si_2PO_{12}$), and molten sodium. The cell was then operated for about 1650 hours at an operating temperature of about 112° C. and with a controlled current density of about 50 mA/cm². Furthermore, during operation time, the NaSICON was cycled approximately 200 times. This demonstrates the feasibility of using NaSICON in the presence of molten sodium, something never before thought possible.

The experimental results from this second example are shown in FIGS. 4 and 5. Specifically, FIG. 4 illustrates the measured voltage of the experimental embodiment of the cell over the 1650 hours of operation time. In this regard, FIG. 4 shows that after the first 200 hours, or so, the interfacial resistance at the molten Na/NaSICON interface improved and the cell's voltage was reduced (interfacial resistance can include improved wetting characteristics). Furthermore, FIG. 5, which shows the final 100 hours of the cell's operation, shows that for the final 100 hours of the cell's operation, the cell's voltage cycles remained substantially uniform. Accordingly, this second example shows that in a molten sodium secondary cell comprising a NaSICON membrane, the described cell is functional and the NaSICON membrane can be relatively stable in the presence molten sodium for a prolonged period of time.

EXAMPLE 3

In this example, an embodiment of the described cell 10 was prepared to contain a sodium negative electrode 20 and a NiOOH positive electrode 30. A NaSICON membrane approximately 1 mm thick and having a diameter of about 1 inch separated the negative and positive electrode compartments. The positive electrode solution 35 comprised an aqueous solution that included borax at a concentration of about 30%, by weight. The cell was then heated so that the sodium negative electrode became molten. The cell was allowed to come to temperature for approximately one hour before being charged. The cell was charged at a constant 15 mA current. As the cell was operated at an operating temperature of about 120° C. and an external pressure of about 16 psi.

FIG. 6 shows the initial charging curve at 15 mA for four hours at 120° C. The cell was cycled under a variety of test procedures to gain a better understanding of how the NiOOH electrode performs at the elevated operating temperature because no known published literature exists for NiOOH electrodes at molten sodium operating temperatures.

The initial charging was done at a constant current. This method limits the number of cycles that can be done in a given time period, and it is not necessarily the best for the nickel electrode. There are two factors to be considered when creating a charge regime. The first is that a nickel electrode is at its highest resistance at the beginning of charge, when the majority of the material is in the form of $Ni(OH)_2$, and that the electrode is most likely to evolve oxygen at the end of charge. To accommodate both these things, a step charge may be desirable. The second factor is the charge (and step) termination. There are multiple ways to determine the end of charge. These include end of charge voltage, capacity limits (coulomb counting), -dV/dt, temperature and pressure limits.

FIG. 7 demonstrates the slight variation in charge length on the charging curves from Cycle 6 and 7. They are identical in structure, but not in duration. Cycles 6 and 7 demonstrate that for a slightly more than 30% increase in charge, there is only a 15% increase in discharge capacity. It has been widely established that nickel hydroxide electrodes have poor charge acceptance at higher temperatures. It is likely that the results shown in FIG. 7 reflect that trend. There are some options that could increase the utilization of the material, including a high temperature formulation, and increased compression on the nickel electrode. These modifications should increase the gap between mid-point charge voltage and the oxygen evolution potential, which has been linked to improved charge acceptance.

There is a significant increase in resistance as the cell cycles. There are multiple reasons that the resistance of a nickel oxyhydroxide electrode might increase over time. In this case, two reasons seem the most likely. One possibility is that there is a physical degradation of the nickel electrode occurring during cycling. Nickel electrodes, such as those used in conventional in NiMH batteries, do not normally cycle at high heat, without compression, or with excess electrolyte.

FIG. 8 shows the discharge curves of Cycles 6 and 7. There is capacity increase with each cycle, as well as a dramatic increase in cell resistance.

Table 2 shows the cycle life of the Na/NiOOH cell with NaSICON electrolyte membrane used in this example. The discharge cycles never exceeded 20 mAh, which is presumably a C/2.25 rate. The cell's primary purpose was to create the baseline programming for future testing. As such, it was put on a 10mA discharge test for Cycles 14-16. This cell was unable to discharge at that rate, and so it was considered unusable. When the cell was disassembled, there was no visible leak path outside of either half or between the two halves of the cell assembly. However, when the sodium half was disassembled, there had clearly been a reaction, as that the majority had become a white powdery solid.

TABLE 2

Charge capacities, discharge capacities, and discharge rates for all cycles of the Na/NiOOH cell with NaSICON electrolyte membrane.
Table 2. Charge capacities, discharge capacities, and discharge rates for all cycles of Na/NiOOH cell.

|  | Charge Capacity (mAh) | Discharge Capacity (mAh) | Discharge Rate (mA) |
|---|---|---|---|
| Cycle 1 | 59.96 | 3.20 | 1 |
| Cycle 2 | 29.92 | 28.75 | 10 |
| Cycle 3 | 30.83 | 25.60 | 10 |
| Cycle 4 | 28.79 | 34.89 | 10 |
| Cycle 5 | 30.73 | 21.85 | 20 |
| Cycle 6 | 41.94 | 28.16 | 15 |
| Cycle 7 | 55.45 | 32.41 | 15 |
| Cycle 8 | 62.28 | 34.05 | 15 |
| Cycle 9 | 56.46 | 3.88 | 1, 5 |
| Cycle 10 | 26.87 | 26.20 | 1, 5 |
| Cycle 11 | 24.76 | 19.02 | 4.5 |
| Cycle 12 | 13.50 | 12.68 | 4.5 |
| Cycle 13 | 12.62 | 0.01 | 4.5 |
| Cycle 14 | 28.78 | N/A | 10 |
| Cycle 15 | 22.56 | N/A | 10 |
| Cycle 16 | 40.27 | N/A | 10 |
| Cycle 17 | 3.51 | 8.35 | 1 |

This example demonstrates the effectiveness of a low-temperature molten sodium secondary cell using a sodium ion conductive electrolyte membrane, such as a NaSICON material. In addition, the nickel oxyhydroxide and nickel hydroxide nickel positive electrode works in the high temperature setting of a molten sodium cell.

EXAMPLE 4

The performance of the Na/NiOOH cell, as described above in Example 3, operated at 120° C. was compared to a nickel metal hydride (NiMH) battery operated at room temperature. The NiMH battery was constructed using a metal hydride negative electrode from a commercial, unused metal hydride battery. A NaSICON electrolyte membrane was used having the same composition, size, and thickness as used in the cell of Example 3. The positive electrode was a freshly prepared $Ni(OH)_2$ electrode was used having a similar theoretical capacity as the $Ni(OH)_2$ cathode of Example 3. A 35 wt. % NaOH solution was added to both the negative and positive electrode compartments. The cell was operated at room temperature. FIG. 9 depicts a comparison of charge and discharge cycles for the Na/NiOOH cell of Example 3 operated at 120° C. with the NiMH cell operated at room temperature. The cells were discharged at a rate of C/2, that it, a rate of one half the cell's capacity.

This example demonstrates that the nickel oxyhydroxide and nickel hydroxide nickel positive electrode works in the high temperature setting of a molten sodium cell. As anticipated, the molten sodium cell operated at higher power and lower capacity compared to the room temperature cell. The higher power is due to the higher operating voltage. The lower capacity is due to the inability to fully charge the cell because of close oxygen evolution potential under charging conditions.

While specific embodiments and examples of the present invention have been illustrated and described, numerous modifications come to mind without significantly departing from the spirit of the invention, and the scope of protection is only limited by the scope of the accompanying claims.

The invention claimed is:

1. A molten sodium secondary cell, comprising:
   a sodium metal negative electrode, which electrochemically oxidizes to release sodium ions during discharge and electrochemically reduces sodium ions to sodium metal during recharging;
   a positive electrode compartment comprising a positive electrode disposed in a liquid positive electrode solution, wherein the positive electrode comprises nickel oxyhydroxide and nickel hydroxide; and
   a sodium ion conductive electrolyte membrane that separates the sodium metal negative electrode from the liquid positive electrode solution,
   wherein the sodium metal negative electrode is molten and in contact with the conductive electrolyte membrane as the cell operates, and wherein the cell functions at an operating temperature between about 100° C. and about 170° C.

2. The cell of claim 1, wherein the sodium ion conductive electrolyte membrane comprises NaSICON material.

3. The cell of claim 2, wherein the NaSICON material comprises a composite membrane having a porous layer and a dense functional layer.

4. The cell of claim 1, wherein the liquid positive electrode solution comprises sodium hydroxide and a substance selected from borax, glycerol, and water.

5. The cell of claim 1, wherein the liquid positive electrode solution comprises glycerol and a substance selected from borax, sodium hydroxide, and water.

6. The cell of claim 1, wherein the liquid positive electrode solution comprises a combination of substances selected from sodium hydroxide, sodium silicate, glycerol, water, sodium borate, borax, sodium borohydride, sodium carbonate, sodium phosphate, sodium glycerol, and sodium iodide.

7. The cell of claim 1, wherein the liquid positive electrode solution comprises between about 4% and about 50% sodium hydroxide, by weight.

8. The cell of claim 1, wherein the cell functions when the operating temperature is between about 100° C. and about 150° C.

9. The cell of claim 1, wherein the cell functions when the operating temperature is between about 110° C. and about 130° C.

10. A molten sodium rechargeable cell, comprising:
a sodium metal negative electrode, which electrochemically oxidizes to release sodium ions during discharge and electrochemically reduces sodium ions to sodium metal during recharging;
a positive electrode compartment comprising a positive electrode disposed in an aqueous liquid positive electrode solution; and
a NaSICON, sodium ion conductive electrolyte membrane that separates the sodium metal negative electrode from the liquid positive electrode solution,
wherein the sodium metal negative electrode is molten and in contact with the conductive electrolyte membrane as the cell operates, and wherein the cell functions at an operating temperature between about 100° and about 150° C.

11. The cell of claim 10, wherein the liquid positive electrode solution comprises between about 4% and about 50% sodium hydroxide, by weight.

12. The cell of claim 10, wherein the cell functions when the operating temperature is between about 110° C. and about 130° C.

13. The cell of claim 10, wherein the positive electrode comprises nickel oxyhydroxide and nickel hydroxide.

14. The cell of claim 10, wherein the liquid positive electrode solution comprises from about 0 to about 50% sodium hydroxide, by weight; from about 0 to about 96% glycerol, by weight; from about 0 to about 45% borax, by weight; and from about 0 to about 93% water, by weight.

15. A method for providing electrical potential from a molten sodium secondary cell, the method comprising:
providing a molten sodium secondary cell, comprising:
a sodium metal negative electrode, which electrochemically oxidizes to release sodium ions during discharge and electrochemically reduces sodium ions to sodium metal during recharging;
a positive electrode system comprising a positive electrode disposed in a liquid positive electrode solution, wherein the liquid positive electrode solution comprises between about 4% and about 50% sodium hydroxide, by weight; and
a sodium ion conductive electrolyte membrane that separates the sodium metal negative electrode from the liquid positive electrode solution; and
heating the sodium metal negative electrode to a temperature between about 100° C. and about 170° C. so that the sodium metal negative electrode is molten and in contact with the sodium ion conductive electrolyte membrane and so that the sodium metal negative electrode oxidizes to release the sodium ions and allows the cell to discharge electricity.

16. The method of claim 15, wherein the sodium ion conductive electrolyte membrane comprises NaSICON material.

17. The method of claim 15, further comprising maintaining the temperature of the sodium metal negative electrode between about 110° and about 130° C.

18. The method of claim 15, further comprising recharging the cell by passing an electrical potential between the sodium metal negative electrode and the positive electrode to cause the sodium negative electrode to electrochemically reduce sodium ions to sodium metal.

19. The method of claim 15, wherein the liquid positive electrode solution comprises from about 0 to about 50% sodium hydroxide, by weight; from about 0 to about 96% glycerol, by weight; from about 0 to about 45% borax, by weight; and from about 0 to about 93% water, by weight.

20. A molten sodium secondary cell, comprising:
a negative electrode, which electrochemically oxidizes to release sodium ions during discharge and electrochemically reduces sodium ions to sodium metal during recharging;
a positive electrode compartment comprising a positive electrode disposed in a liquid positive electrode solution, wherein the liquid positive electrode solution comprises one or more substances chosen from sodium hydroxide, glycerol, sodium silicate, water, sodium borate, borax, sodium borohydride, sodium carbonate, sodium phosphate, sodium glycerol, and sodium iodide; and
a sodium ion conductive electrolyte membrane that separates the negative electrode from the liquid positive electrode solution,
wherein the negative electrode is molten and in contact with the conductive electrolyte membrane as the cell operates, and wherein the cell functions at an operating temperature between about 100° C. and about 170° C.

21. The molten sodium secondary cell of claim 20, wherein the liquid positive electrode solution comprises between about 4% and about 50% sodium hydroxide, by weight.

22. The molten sodium secondary cell of claim 20, wherein the positive electrode comprises nickel oxyhydroxide and nickel hydroxide.

* * * * *